US009508026B2

(12) United States Patent
Theodorakopoulos et al.

(10) Patent No.: US 9,508,026 B2
(45) Date of Patent: Nov. 29, 2016

(54) SYSTEM AND A METHOD FOR CAMERA MOTION ANALYSIS AND UNDERSTANDING FROM A VIDEO SEQUENCE

(71) Applicant: IRIDA LABS S.A., Patras (GR)

(72) Inventors: Ilias Theodorakopoulos, Aigio (GR); Nikos Fragoulis, Patras (GR)

(73) Assignee: IRIDA LABS S.A., Patras (GR)

( * ) Notice: Subject to any disclaimer, the term of this patent is extended or adjusted under 35 U.S.C. 154(b) by 23 days.

(21) Appl. No.: 14/321,424

(22) Filed: Jul. 1, 2014

(65) Prior Publication Data

US 2016/0005184 A1 Jan. 7, 2016

(51) Int. Cl.
*G06K 9/00* (2006.01)
*G06K 9/62* (2006.01)

(52) U.S. Cl.
CPC ......... *G06K 9/6286* (2013.01); *G06K 9/00335* (2013.01); *G06K 9/6272* (2013.01); *G06K 9/6277* (2013.01)

(58) Field of Classification Search
CPC ............ G06K 9/00711; G06T 7/2013; G06T 7/2066; G06T 7/2086
See application file for complete search history.

(56) References Cited

U.S. PATENT DOCUMENTS

| | | | | |
|---|---|---|---|---|
| 6,366,701 B1 * | 4/2002 | Chalom | ............ | G06F 17/30811 382/107 |
| 6,571,193 B1 * | 5/2003 | Unuma | ................ | A43B 3/0005 340/853.2 |
| 7,447,337 B2 | 11/2008 | Zhang et al. | | |
| 2004/0091047 A1 * | 5/2004 | Paniconi | ............... | G06T 7/2006 375/240.16 |
| 2008/0273752 A1 * | 11/2008 | Zhu | ........................ | B60W 40/02 382/103 |
| 2010/0272323 A1 * | 10/2010 | Oya | ................. | G08B 13/19602 382/107 |
| 2010/0277649 A1 | 11/2010 | Conklin | | |
| 2011/0261225 A1 * | 10/2011 | Niinami | .................. | G06T 7/204 348/223.1 |
| 2012/0320224 A1 * | 12/2012 | Miyoshi | ................. | H04N 5/217 348/207.1 |
| 2013/0294514 A1 | 11/2013 | Rossato et al. | | |

OTHER PUBLICATIONS

U.S. Appl. No. 13/952,894, filed Jul. 29, 2013, Fragoulis.
Ljung, Lennart "System Identification, Theory for the User" 2nd Edition, Chapter 4, pp. 87-88, Linkoping University, Sweden, Prentice Hall PTR, 1999.
Puzicha, Jan et al. "Empirical Evaluation of Dissimilarity Measures for Color and Texture" The Proceedings of the 7th IEEE International Conference on Computer Vision, 1999, vol. 2.
Duda, Richard O., et al. "Pattern Classification" 2nd Edition, Chapter 4, pp. 44-51 and Chapter 10, pp. 53, Willey 2000.
Young, Peter C. "Recursive Estimation and Time-Series Analysis: An Introduction for the Student and Practitioner" Second Edition, Springer 2011.

(Continued)

*Primary Examiner* — Amara Abdi
(74) *Attorney, Agent, or Firm* — Jason H. Vick; Sheridan Ross, PC

(57) ABSTRACT

In the event that a moving body (e.g. a person, a car, etc.) is outfitted with a video camera or with a camera-equipped device (e.g. a tablet or a mobile phone), the system described in one aspect is able to understand the motion of the moving by analyzing the video frame sequence captured by the camera. This means that the system can categorize the motion of the body-carrying camera to one of several types (e.g., is this a person walking? is this a person running? etc.), understand the nature of the moving body holding the camera-equipped device (e.g. Is this a car?, Is this a person? etc.) and even to identify the moving body (which car?, which person? etc.).

7 Claims, 7 Drawing Sheets

(56) References Cited

OTHER PUBLICATIONS

Iglewicz, Boris et al. "How to Detect and Handle Outliers—vol. 16", The ASQC Basic References in Quality Control: Statistical Techniques, Edward F. Mykytka, Ph.D., Editor; Jan. 1, 1993; 84 pages.

Office Action for U.S. Appl. No. 13/952,894, mailed Sep. 28, 2015.
Office Action for U.S. Appl. No. 13/952,894, mailed Apr. 28, 2016.

* cited by examiner

SYSTEM AND A METHOD FOR CAMERA MOTION ANALYSIS AND UNDERSTANDING FROM A VIDEO SEQUENCE

BACKGROUND

1. Field

An exemplary embodiment of this invention relates to the field of motion analysis and understanding. More specifically one exemplary embodiment relates at least to a method and a system capable of analyzing and understanding the motion that a body, carrying a device equipped with a camera of any kind, undertakes using the video sequence that the camera captures. Another exemplary embodiment of this invention relates to a method and a system capable of distinguishing the environment that the body carrying the camera-equipped device is in and even identifying the person that operates the camera-equipped device.

2. Background

Camera motion analysis and understanding is an important part of understanding video content, and plays a significant role in video browsing, retrieval, editing, printing, etc., in many multimedia systems, including personal computers (PCs), stationary or portable digital entertainment systems, cameras, and mobile devices such as smartphones, tablets, etc.

Existing approaches to motion analysis and content understanding are too slow for common processing systems like PCs and embedded systems like these used in smart cameras and smart mobile appliances (smartphones, tablets, or the like). Existing approaches are typically designed for specific tasks, e.g., tracking the movement of a person (with a known-face model) or a car (with a pre-defined car model), and because of these simplifications have a limited general applicability.

SUMMARY

In the event that a moving body (e.g. a person, a car, etc.) is outfitted with a video camera or with a camera-equipped device (e.g. a tablet or a mobile phone), the system described in one exemplary embodiment of the current invention is able to understand the motion of the moving by analyzing the video frame sequence captured by the camera.

This means that the system can categorize the motion of the body-carrying camera to one of several types (e.g., is this a person walking? is this a person running? etc.), understand the nature of the moving body holding the camera-equipped device (e.g. Is this a car?, Is this a person? etc.) and even to identify the moving body (which car?, which person? etc.).

Furthermore, in the event that a person operates the lens of a camera in some way (e.g. the camera operator zooms-in or zooms-out), the system described in one embodiment of the current invention is able to understand the nature of the operator's control command by analyzing the video frame sequence captured by the camera.

In one aspect of the current invention, the camera motion is analyzed through the calculation of camera motion parameters. These parameters are able to describe the motion that an image produced by a specific moving camera undertakes, due to this motion.

The method of transforming camera motion parameters into camera motion information goes through the following exemplary stages:

Calculation of these motion parameters by: determining local motion vectors from pairs of successive video frames captured by the camera.

Removing local motion vector outliers.

Calculation of the global motion of the camera using these local motion vectors.

Modeling the time-behavior of each global motion parameter using a set of polynomial time-series models. These models are trained to model the time behavior of each parameter over predetermined time segments or continuously in a recursive way, updating continuously a state to model the current motion.

Determination of the motion status from the camera motion parameters behavior over time using the coefficients of the polynomial time-series models. Motion status is then obtained by performing pattern classification and recognition using supervised learning techniques. Due to the potentially large dimensionality of cluster samples, dimensionality reduction techniques (using Multiclass Linear Discriminant Analysis as we describe herein) are applied in this stage, to dramatically reduce the computational complexity and make the system appropriate for embedded system implementation and other applications where lower computational complexity is beneficial.

Categorizing the motion to one or more of various discrete motion categories and outputting the motion state in the form of a membership percentage to the various motion categories.

BRIEF DESCRIPTION OF THE DRAWINGS

The exemplary embodiments of the invention will be described in detail, with reference to the following figures, wherein.

DETAILED DESCRIPTION

Figure 1:
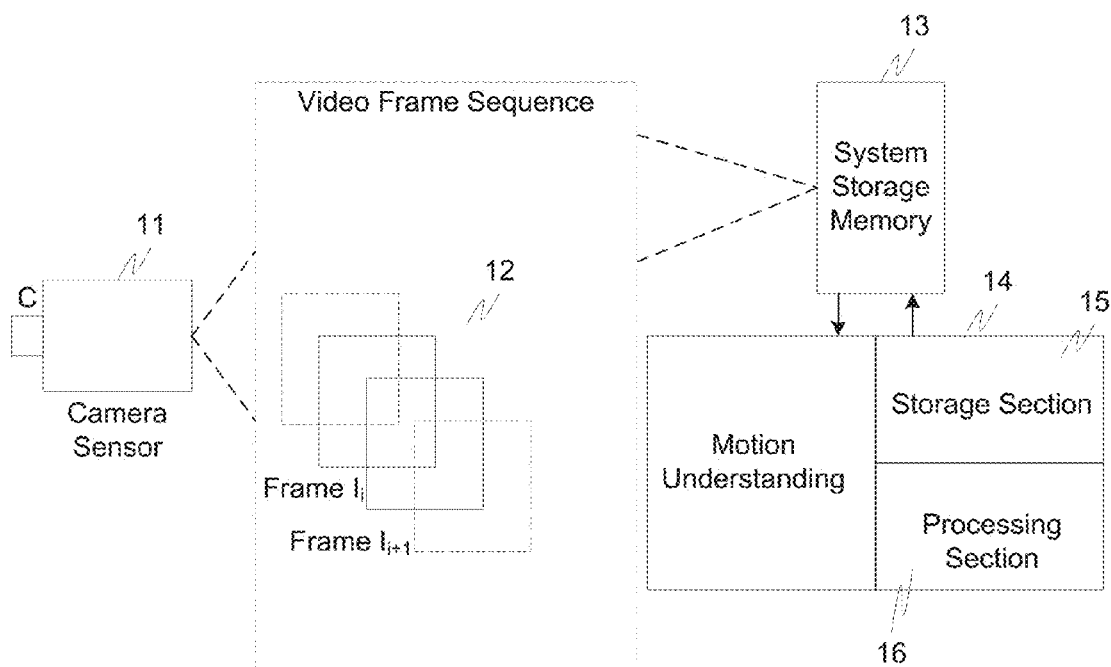
FIG. 1 illustrates an exemplary motion analysis system.

In accordance with one exemplary embodiment, a system is disclosed that is able to understand the motion of a device equipped with a digital camera by analyzing the video sequence captured by this camera, using a system like the one shown in FIG. 1. This system uses a camera sensor (11 in FIG. 1) which captures the video frames (12 in FIG. 1), stores the most recent frame in a memory (13 in FIG. 1) and then processes it with a Motion Understanding device (14 in FIG. 1), comprised of a storage section (15 in FIG. 1) and a processing section (which includes one or more processors) (16 in FIG. 1) and in which the motion state is determined.

Figure 2:
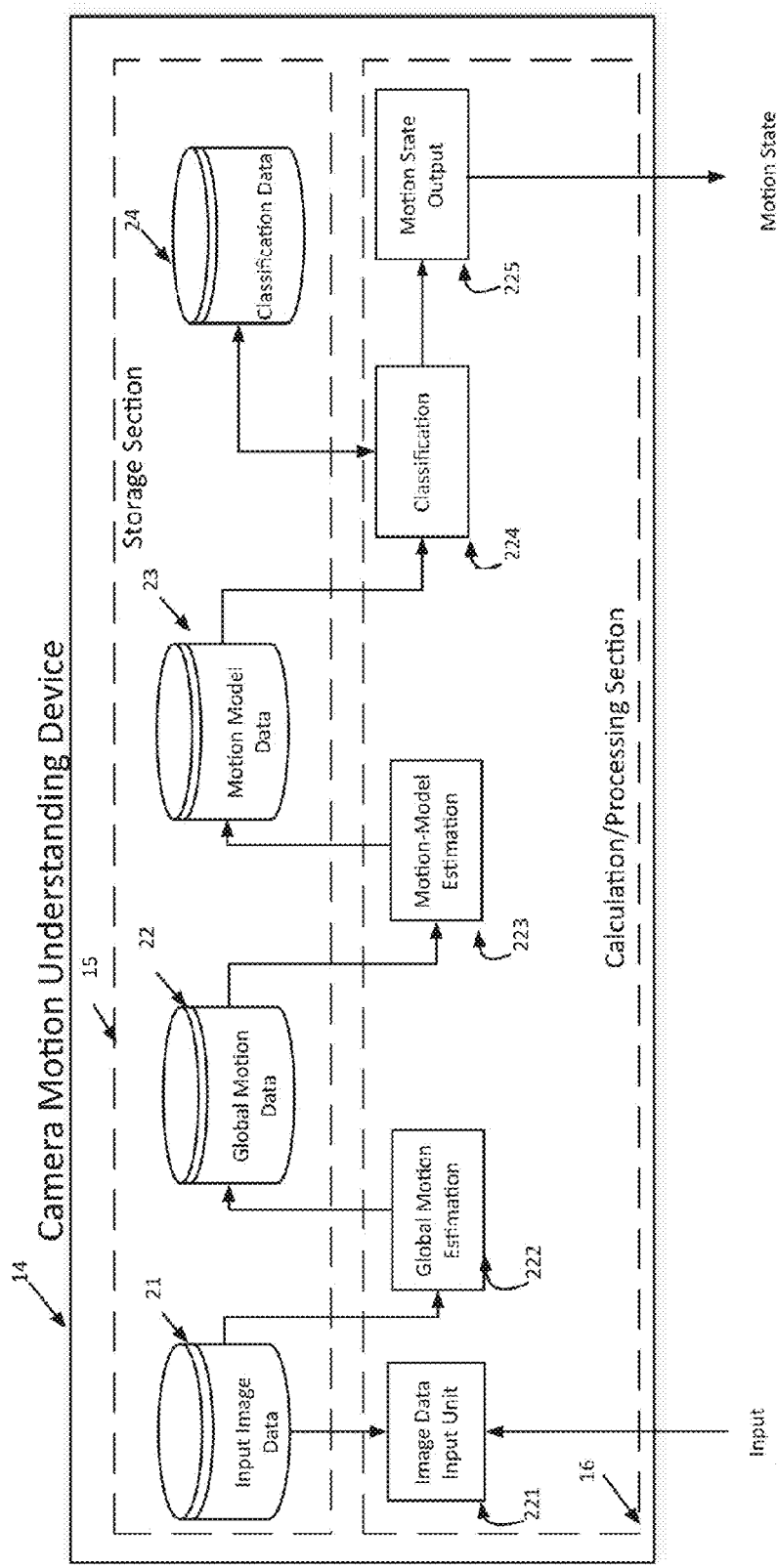
FIG. 2 illustrates an exemplary camera motion understanding device.

An exemplary Motion Detection Device through which the system extracts and manages the optical flow in order to calculate the motion information is shown in FIG. 2.

This exemplary system functions as follows: First two consecutive frames $I_i$ and $I_{i+1}$, (12 in FIG. 1) are input into the Image Data Input Unit (221 in FIG. 2) from the Storage Memory (13 in FIG. 1) and are temporarily stored into the Input Image Data memory (21 in FIG. 2). The data are then fed into the Global Motion Estimation Unit (222 in FIG. 2). The global motion Estimation unit estimates the global motion of frame $I_i$ in relation to the frame $I_{i+1}$, in the video sequence, produces a global motion parameter set corresponding to the physical motion of the frame and stores the data to the global motion data memory (22 in FIG. 2). These data are then fed into the motion-model estimation unit (223 in FIG. 2). This unit estimates a motion model from the time-series corresponding to the development of each parameter over time and stores the models to the Motion-Model Data memory (23 in FIG. 2). These model data are then fed into the Classification unit (224 in FIG. 2).

The Classification unit (224 in FIG. 2) uses classification information stored into classification data memory (24 in FIG. 2) at an off-line training phase and classifies the model data into one of the pre-learned states. Then the data are fed into the Motion-State Output unit (225 in FIG. 2), which in turn outputs the recognized motion state.

In the following sections, the above-referenced units are explained in detail.

Global Motion Estimation Unit (222 in FIG. 2)

The Global Estimation unit is responsible for estimating the motion parameters of a camera from the analysis of two subsequent frames.

The aim of the Global Motion Estimation unit is to analyze optical flow as represented by the "cleared" (i.e. outlier-free) local motion vectors, in order to obtain the motion of the camera.

Figure 3:
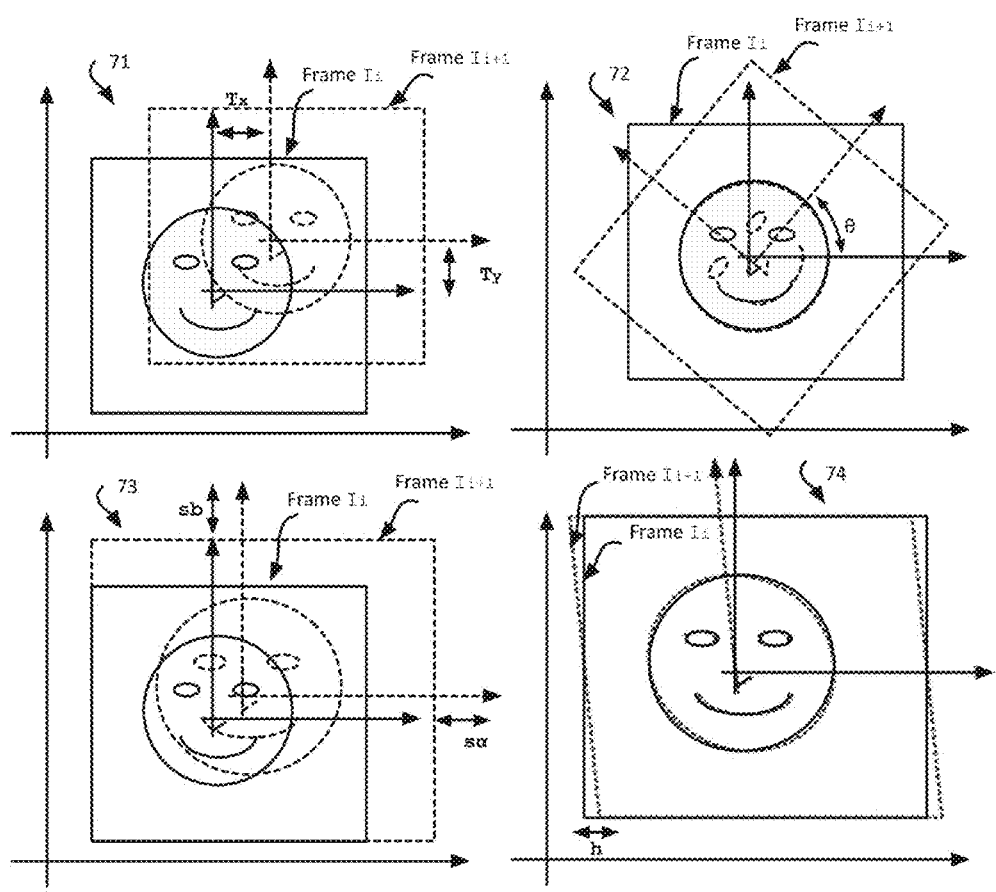
FIG. 3 illustrates a 3-D space showing the full motion of a camera in the 3-D space characterized by a total of eight parameters.

The full motion of a camera in the 3-D space can be characterized by a total of eight parameters, known as the Degrees of Freedom (DoF). These are two translational components, a rotational component, two scale components, two shearing and a non-linearity component of the shearing. However, in one approach the motion of the camera is estimated using the six most dominant parameters. That is, two Translational components ($T_x$, $T_y$, 71 in FIG. 3), a Rotational component ($\theta$, 72 in FIG. 3), two scale components (s$\alpha$ in x-dimension and sb in y-dimension, 73 in FIG. 3) and a shearing component (h, 74 in FIG. 3).

A system appropriate to fulfill this task has been described in U.S. patent application Ser. No. 13/952,894 entitled "A SYSTEM AND A METHOD FOR MOTION ESTIMATION BASED ON A SERIES OF 2D IMAGES," filed Jul. 29, 2013, the contents of which are incorporated herein by reference in their entirety. The output of this unit is a global motion parameter vector PAR={$T_x$, $T_y$, $\theta$, s$\alpha$, sb, h} which is stored in Global Motion Data memory (22 in FIG. 2).

Motion-Model Estimation Unit (223 in FIG. 2)

Figure 4:
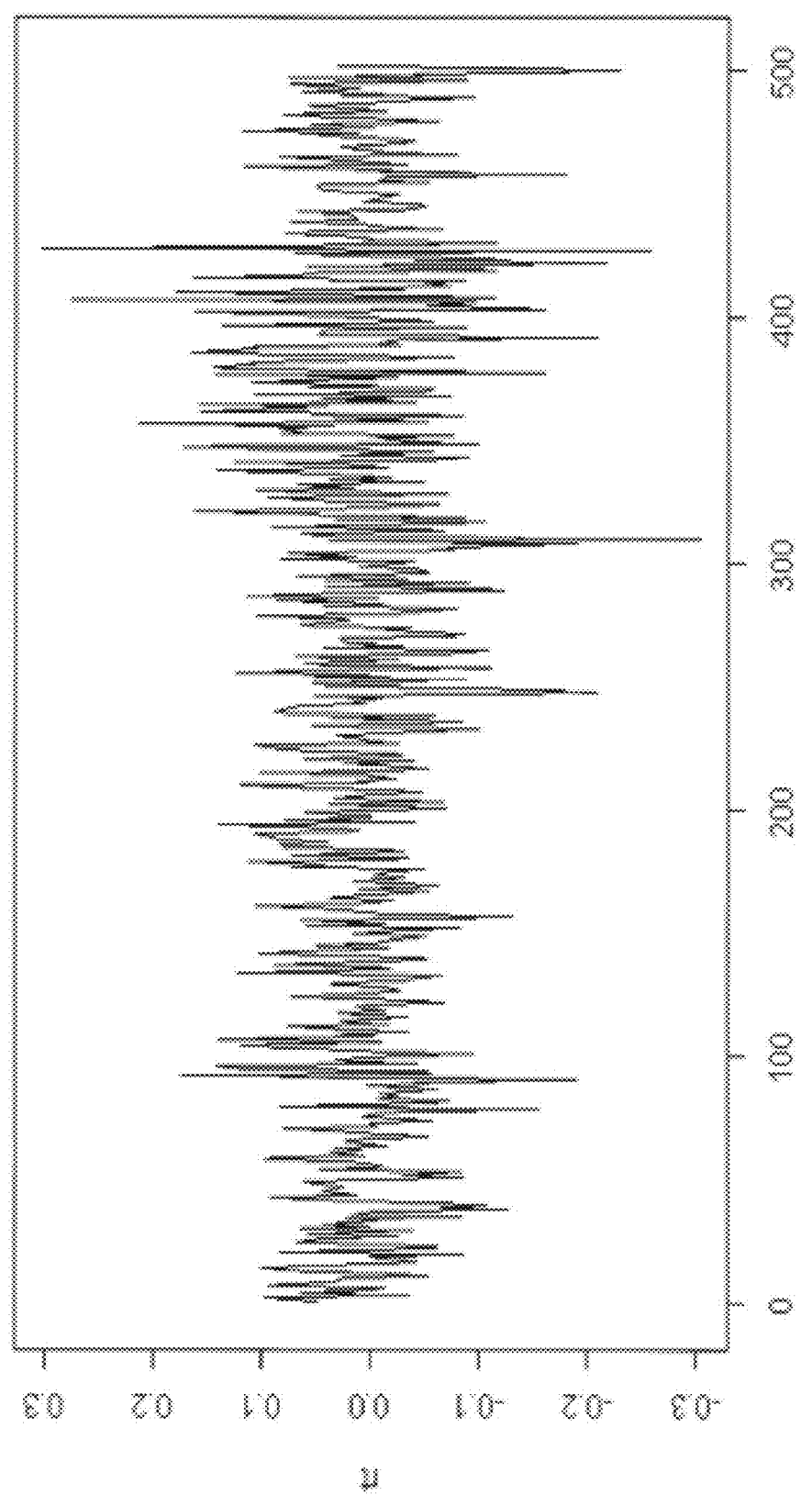
FIG. 4 illustrates a specific time dependence of the value of the parameter.

One function of this unit is to estimate a model of the motion of the camera over time and works as follows:

The motion of the camera produces a different set of parameters PAR$_i$={$T_{xi}$, $T_{yi}$, $\theta_i$, s$\alpha_i$, sb$_i$, h$_i$} at every time t for each pair of frames $I_i$ and $I_{i+1}$. This causes a specific time dependence of the value of the parameter as shown in FIG. 4 as an example. For a certain time period, the motion of the camera-equipped body, corresponding to a specific action (shaking, zooming, walking, driving etc.) or a specific environment (car, train etc.), results in a specific time behavior, which can be modeled by using polynomial modeling.

The models are learned, potentially off-line, as follows:

Initially, a video is recorded, when the camera-equipped device undertakes motion of a specific type (e.g. walking, running, etc.) or the device operates in a specific environment (e.g. home, car, etc.) and/or is operated by a specific person. Then, the global motion estimation block (222 in FIG. 2) is employed to extract the time-series behavior of the camera motion parameters, corresponding to various device motions as described above.

Subsequently each time-series sequence is partitioned to a specific number of time-segments $N_S$ corresponding to time intervals of a specific duration. For each time interval, a polynomial time-series model is trained, each model corresponding to a vector. Given the fact that in each of the segments the motion of the camera-equipped device is of the same type, then these $N_S$ vectors of model parameters should form a cluster in the model feature space, that is they should form a multi-dimensional Euclidean space for which the model vector parameters are the coordinates.

Repeating this procedure for various device motions, operating environments and users, a separate cluster in the feature space can be created for each. For a number of $N_M$ different motions, the result will be the formation of $N_M$ clusters, each one corresponding to a different kind of motion.

In the recognition phase, the following two exemplary schemes can be followed:

According to the first scheme the time-series sequence of a parameter can be partitioned to a specific number of segments $N_S$ corresponding to time intervals of an appropriate duration. Then, for each time interval, a model is trained and then classified by using a classification scheme described elsewhere, e.g. as in 224 in FIG. 2 as described below.

In the second scheme, which is followed in the current embodiment, a model is trained continuously and recursively: After a first training period, necessary for the system to stabilize its functional state, a polynomial time-series model is produced and updated for every sample of the parameter under consideration which is then classified. This produces a motion state characterization for every sample (parameter value), resulting in a continuous and real-time motion-state estimation system.

Polynomial Modeling

There are a number of methods for modeling the time behavior of a parameter. One of the most common approaches is the polynomial time-series modeling. A polynomial model uses a generalized notion of transfer functions to express the relationship between the input, u(t), the output y(t), and a white noise source e (t) using the equation [1]:

$$A(q, \theta)\hat{y}(t|\omega) = \frac{B(q, \omega)}{F(q, \omega)}u(t-d) + \frac{C(q, \omega)}{D(q, \omega)}e(t) \quad (1)$$

where, $$A(q,\omega)=1+a_1q^{-1}+\ldots+a_{NA}q^{-NA}$$

$$B(q,\omega)=1+b_1q^1+\ldots+b_{NB}q^{-NB}$$

$$C(q,\omega)=1+c_1q^1+\ldots+c_{NC}q^{-NC}$$

$$D(q,\omega)=1+c_1q^1+\ldots+d_{ND}q^{-ND}$$

$$F(q,\omega)=1+f_1q^1+\ldots+f_{NF}q^{-NF}$$

The functions A, B, C, D, and F are polynomials of various orders expressed using the time-shift operator q, and $\omega$ is a vector of the coefficients of the polynomial. In practice, not all the polynomials are simultaneously active; by selecting proper values for the polynomials A, B, C, D, F, simpler forms are employed, such as ARX, ARMAX, Output-Error, and Box-Jenkins models [1].

In various embodiments, any of the aforementioned methods can be used.

The general polynomial equation (1) is written in terms of the time-shift operator $q^{-1}$. To understand this time-shift operator, consider the following discrete-time difference equation:

$$y(t)+a_1y(t-T)+a_2y(t-2T)=b_1u(t-T)+b_2u(t-2T) \quad (2a)$$

where y(t) is the output, u(t) is the input, and T is the sampling interval. $q^{-1}$ is a time-shift operator that compactly represents such difference equations using $q^{-1}u(t)=u(t-T)$.

Then (2a) can be written as $$y(t)+a_1q^{-1}y(t)+a_2q^{-2}y(t)=b_1q^{-1}u(t)+b_2q^{-2}u(t) \quad (2b)$$

The model (1) is uniquely defined by the parameter vector $\omega$, which is defined as:

$$\omega=[a_1,a_2,\ldots a_{NA},b_1,b_2,\ldots b_{NB},c_1,c_2,\ldots,c_{NC},d_1,d_2,\ldots,d_{ND}] \quad (3)$$

where NA, NB, NC, ND are the order of the polynomials A, B, C, D.

In a preferred embodiment, the ARMA model is used. An ARMA model can be described by the following equation:

$$y(t|\omega) = \frac{C(q,\omega)}{A(q,\omega)}e(t) = w(t,\omega) \quad (4)$$

if we define $\phi(t,\omega)=[e(t-1)\ldots e(t-NC)-w(t-1,\omega)\ldots w(t-NA,\omega)]$ then the model (4) can be written as:

$$y(t|\omega)=\phi^T(t,\omega)\omega \quad (5)$$

The goal of using such a model is to have a system that can learn to predict values of the variable y at time t by using a number N of past values of y e.g. y(t−1), y(t−2), . . . y(t−N). In this invention the variable y is made equal to one of the parameters of the global motion vector PAR which is the output of the Global Motion Estimation unit (222 in FIG. 2) and which is stored in Global Motion Data memory (22 in FIG. 2).

Model Estimation is equivalent to the calculation of the model parameter vector $\omega$. This model parameter vector is computed by requesting the minimization of the estimation error, which is quantified by using a specific error function E ((o) between the training data sequence and the estimated data. To this end, minimization of the error corresponds to the minimization of the error function:

$$E(\omega,N)=\Sigma_{t=1}^{N}\lambda(\epsilon(t,\omega)) \quad (6)$$

where $$\epsilon(t,\omega)=y(t)-\hat{y}(t|\omega) \quad (7)$$

and $\lambda(.)$ is an error function.

In one implementation the Least Mean Square estimator, $\lambda(\epsilon)=(\frac{1}{2})\epsilon^2$ can be used. The error function can also be time depended of the form $\lambda(\epsilon, t)$. This is useful in cases where various measurements have different reliability, and therefore they can be assigned different weights, or when the model is learned in the progress of time. The time variance can also be incorporated by using a multiplication time-varying function $\beta(N,t)$. Incorporating this function in (6) and using (7) we get:

$$E(\omega,N)=(\frac{1}{2})\Sigma_{k=1}^{N}\beta(N,t)[y(k)-\phi^T(k,\omega)\omega]^2 \quad (8)$$

By using this form of the error function, the requested parameter set $\omega$ can be obtained as $\hat{\omega}_N^{LMS}$ by the following relation.

$$\hat{\omega}_N^{LMS}=\operatorname{argmin}_{\omega}(E(\omega,N)) \quad (9)$$

Equation (9) means that the requested solution will be calculated as the minimum solution.

Equation (9) can be solved in closed form as follows:

$$\hat{\omega}_N^{LMS}=\overline{R}^{-1}(t)fn(t), \quad (10a)$$

where $$\overline{R}^{-1}(t)=\Sigma_{k=1}^{N}\beta(t,k)\phi(k,\omega)\phi^T(k,\omega) \quad (10b)$$

$$fn(t)=\Sigma_{k=1}^{N}\beta(t,k)\phi(k)y(k) \quad (10c)$$

In many cases it is useful to have a model of the system available on-line, while the system is in operation. The model should then be based on observations up to the current time and be gradually built in progress of time. The methods for computing online models are called recursive system identification methods and employ an adaptation scheme based upon the on-line data.

In an exemplary embodiment and in a recursive formulation the parameter set at time t can be calculated using the following formulas:

$$\hat{\omega}_N^{LMS}(t)=\hat{\omega}_N^{LMS}(t-1)+ \overline{R}^{-1}(t)\phi(t)[y(k)-\phi^T(k,\omega)\hat{\omega}_N^{LMS}(t-1)] \quad (11a)$$

$$\overline{R}(t)=\lambda(t)\overline{R}(t-1)+\phi(t)\phi^T(t) \quad (11b)$$

where $$\beta(t,k)=\lambda(t)\beta(t-1,k) \quad (11c)$$

The factor $\lambda(t)$ is in this case an adaptation gain, regulating the rate at which the parameter set $\hat{\omega}$ is adapted in progress of time: Small $\lambda(t)$ corresponds to slow adaptation and large $\lambda(t)$ corresponds to a fast adaptation.

The model parameter vector $\hat{\omega}_N$ (43 in FIG. 5) is estimated for each parameter $P_i$ (41 in FIG. 5) of the motion vector (41 in FIG. 5) extracted by the motion estimation unit. This procedure (45 in FIG. 5) is executed in a recursive way for a specific amount of time, until a steady solution is reached, and after that a set of $N_P$ vectors is formed of size MO each, MO being the order of the polynomial model. Finally, a feature vector $\widehat{FV}=\{\omega_{11},\omega_{12},\ldots,\omega_{1MO},\ldots,\omega_{NP1},\omega_{NP2},\ldots\omega_{2NPMO}\}$ is formed (44 in FIG. 5), which is stored in the Motion-Model Data Memory (23 in FIG. 2) to be later used by the classification unit (224 in FIG. 2).

Classification Unit (224 in FIG. 2)

This unit is focused on classification of a segment of the time series signal corresponding to the each motion parameter.

In one exemplary embodiment of the current implementation, a pattern classification scheme is used for classification. To this end, the system has been previously trained offline, using a database with models corresponding to specific camera or lens motions (e.g. walking, zooming etc), moving bodies (e.g. car, person, a train etc), or users. For each one, the models described in the previous section are evaluated. The various models (serving the role of "features") are then combined into a total feature vector. This feature vector is then projected in an Euclidean space (referred as a the "feature space"). This Euclidean space is defined as a multi-dimensional space with as many dimensions as the feature vector. In such a projection, the feature vectors corresponding to specific camera motions are concentrated (clustered) in separate areas of the multi-dimensional feature space. Consider the example shown in FIG. 6 incorporating a 3-dimensional feature space (51 in FIG. 6). Each point in this space is defined by a vector $\widehat{FV}_1=\{f_1, f_2, f_3\}$ where $f_1, f_2, f_3$ are its three coordinates. The projection of the several feature vectors on this axis-system creates two clusters, one corresponding to a motion of e.g type-1 (53 in FIG. 6) and one corresponding to motion of e.g type-2 (52 in FIG. 6).

The next step is to define the centers of the individual clusters. In one implementation this is achieved via the calculation of the center of mass of each cluster. The center of mass has coordinates $\hat{C}=\{f_1, f_2, \ldots, f_D\}$ where D is the dimensionality of the feature space, and each coordinate $\hat{f}_k$ is defined as:

$$\hat{f}_k = \frac{1}{N_S}\sum_i f_{ki} \qquad (12)$$

where $N_S$ is the number of samples (regions) participating in each cluster. In the 3-dimensional example referred before, the centers of the clusters are indicated as C1 (56 in FIG. 6) and C2 (57 in FIG. 6).

When a new sample is tested, its feature vector $\overline{FV}_T$ is obtained from the Motion-Model Estimation Unit (223 in FIG. 2). This corresponds to a point in the feature space. In order to test into which cluster this test point belongs, the distance of this point from the centers of the clusters is computed using some distance measure such as the L1 (or absolute) distance, or L2 (or root mean squared) distance.

In one implementation the L2 distance is used which is defined as follows: in Cartesian coordinates, if $\overline{P}=(p_1, p_2, \ldots, p_n)$ and $\overline{Q}=(q_1, q_2, \ldots, q_n)$ are two points in Euclidean n-space, then the L2 or Euclidean distance from P to Q, or from $\overline{Q}$, to $\overline{P}$ is given by the following expression:

$$d(\hat{P},\hat{Q})=d(\hat{Q},\hat{P})=\sqrt{\sum_{i=1}^{n}(q_i-p_i)^2} \qquad (13)$$

Figure 5:
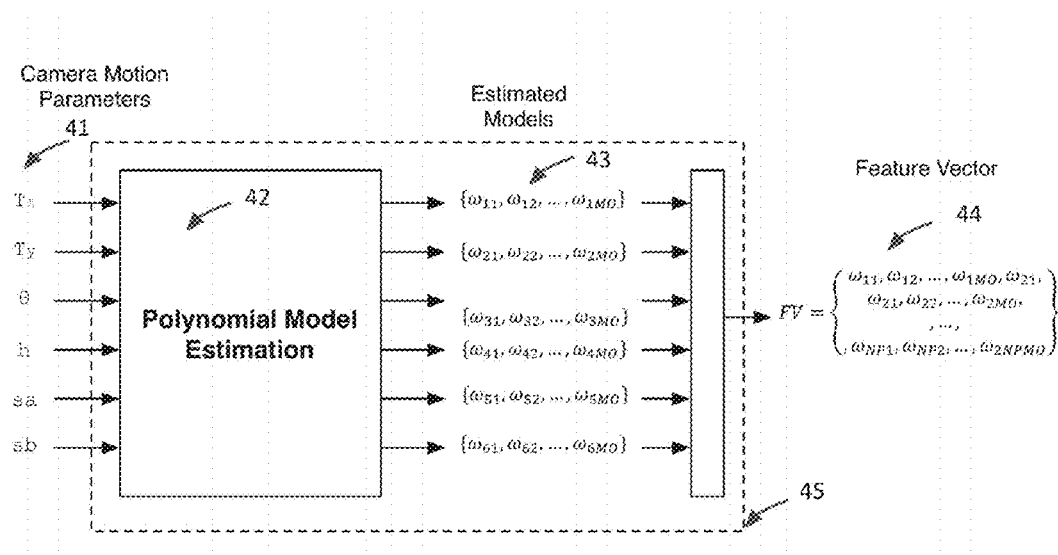
FIG. 5 illustrates model parameter vector estimation for each parameter.
Figure 6:
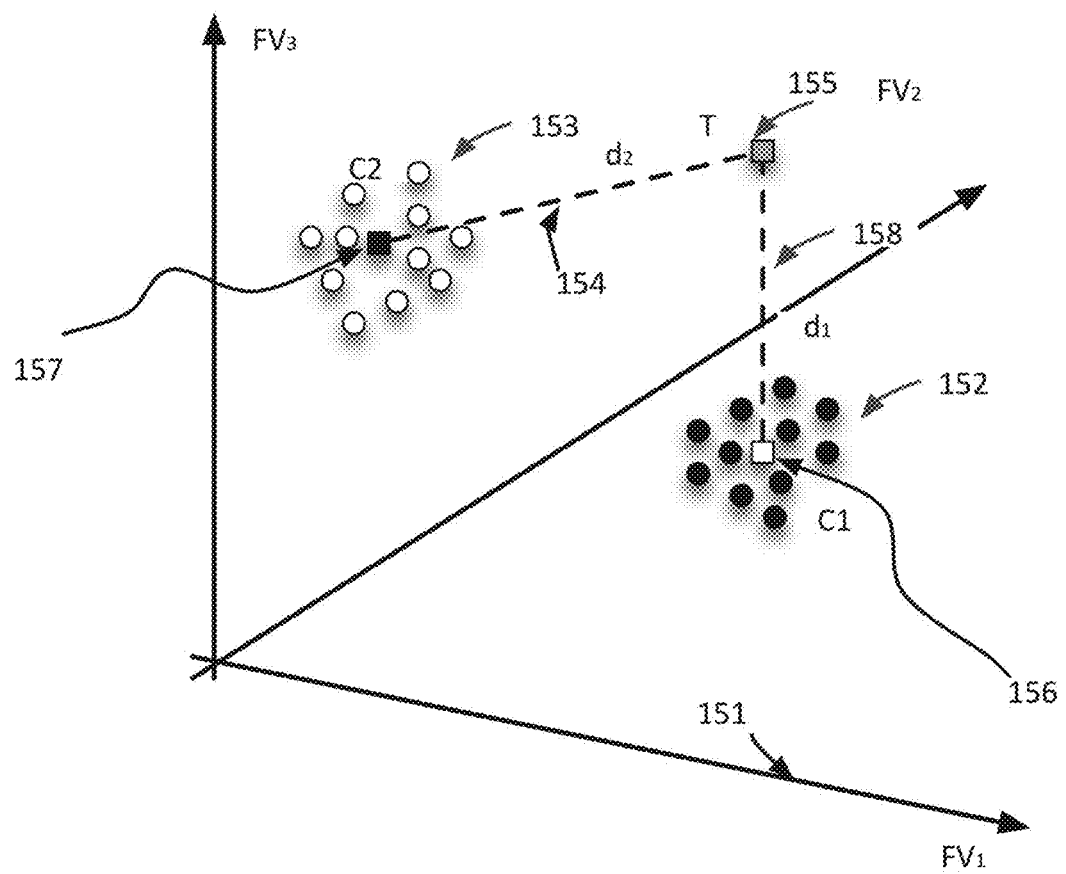
FIG. 6 illustrates an exemplary 3-dimensional feature space.

In the 3-dimensional example of FIG. 5, the distance of the test point T (55 in FIG. 5) from the cluster-center C1 52 in FIG. 6) is d1 (58 in FIG. 6) and from the cluster-center C2 (57 in FIG. 6) is d2 (54 in FIG. 6).

In a different implementation the samples of each cluster can be modeled as multi-dimensional normal distributions N (μ, Σ) having a mean vector μ and a covariance matrix Σ. After doing this, distribution distance measures can be used such as the Mahalanobis distance, Kolmogorov-Smirnov distance the Kullback-Leibler divergence, $\chi^2$ statistics distance etc[2], in order to calculate the distance of a sample (or a cluster of samples forming a distribution) from a specific cluster.

Once the distances of the test point from the centers of the clusters (or the clusters considered as distributions) are computed, the decision about into which cluster this sample belongs to, is taken according a proximity criterion. That is, the point belongs to the nearest cluster according to the distance measure used. Once this decision has been made, the segment under test has been classified.

In a different implementation and if the dimensionality of the feature space (corresponding to the size of the feature vector) is large, dimensionality reduction techniques like PCA (Principal Component Analysis) or LDA (Linear Discriminant Analysis) [3] or a combination of these two can be used. In this way, the dimensionality of the feature space can be reduced dramatically to a number of $N_M-1$, where $N_M$ is the number of different motions that the system will be able to recognize. This fact is extremely important in embedded system implementations where the resources, in terms of memory and processing power, are often limited. In such platforms the linear algebra operations are computationally intensive when engage large matrices. Therefore, reducing the size of the related matrices is a very critical step towards relaxing the computational needs and achieve real-time performance in embedded systems.

In the current embodiment, a Multiclass Linear Discriminant Analysis (MLDA) is used as dimensionality reduction scheme. Multiclass Linear Discriminant Analysis aims to map a set of samples from $N_M$ classes into the linear subspace that best separates the samples of the different classes, while keeping each class as compact as possible. In other words, LDA seeks for the linear projection that maximizes the ratio of between-class variance to the within-class variance. The within-class covariance is the covariance of the samples participating to each class and indicates the spread of the class in the feature space having the meaning of the size or the volume of the class. The between class covariance is computed for the total population and indicates the spread of the total population in the feature space.

In the multivariate case, the separation of the classes along a direction $\overline{w}$ of the feature space is defined as:

$$S = \frac{\overline{w}^T \sum_{btw} \overline{w}}{\overline{w}^T \sum \overline{w}} \qquad (14)$$

where Σ is the covariance matrix of the dataset, $\Sigma_{btw}$ is the between-class covariance matrix:

$$\sum_{btw} = \frac{1}{N_M}\sum_{i=1}^{N_M}(\hat{\mu}_i-\hat{\mu})(\hat{\mu}_i-\hat{\mu})^T \qquad (15)$$

$\hat{\mu}$ is the mean of the total population and $\hat{\mu}_i$ is the mean of the i-th class. Seeking of the $k \in \{1, \ldots, N_M-1\}$ orthogonal directions which offer the highest class separation is equivalent of solving the following generalized eigenvalues problem:

$$\Sigma_{btw}\hat{W}=\Sigma_{wn}\hat{W}\lambda, \qquad (16)$$

where $\Sigma_{wn}$ is the average within-class covariance matrix. In order to simplify computations, instead of using (15) the between-class covariance $\Sigma_{btw}$ is computed by subtracting the within-class covariance from the covariance matrix of the data i.e.

$$\Sigma_{btw}=\Sigma-\Sigma_{wn} \qquad (17)$$

The k requested orthogonal directions are calculated by selecting the k column vectors of $\overline{W}$ (eigenvectors), which corresponds to the largest k values from the diagonal of the eigenvalues matrix λ. These form a projection matrix $\overline{M_P}$ of dimension $n \times (N_M-1)$. To this end, projecting each feature vector $\hat{P}=(p_1, p_2, \ldots, p_n)$ to the new subspace is equivalent to a vector multiplication of the vector $\overline{P}$ with the projection matrix $\overline{M_P}$ resulting in a new vector $\hat{P}'$ with reduced dimension:

$$\hat{P}'=\hat{P} \cdot \widehat{M_P} \qquad (18)$$

The classification process as described above can then be applied to the reduced-dimensionality feature space.

In a further different implementation, an Artificial Neural Network classifier or any other type of classifier can be used, either on the original or at the reduced feature space.

In an even further different implementation, apart for being able to discretely categorize the motion to various discrete motion categories, the system is able to output the motion state in the form of a membership percentage to the various motion categories. This is achieved by assigning to each sample a score vector $\widehat{SC}=\{sc_1, sc_2, \ldots, sc_D\}$ formed as follows:

First a distance $d_i$ of a sample $\overline{FV}_T$ from each class-center $\hat{C}_i$ is computed, using a multivariate Gaussian function:

$$d_i = \frac{1}{\sqrt{(2\pi)^D |\Sigma_{wn_i}|}} \exp\left(-\frac{1}{2}(\overline{FV}_T - \hat{\mu}_i)^T \sum_{wn_i}^{-1} (\overline{FV}_T - \hat{\mu}_i)\right) \quad (19)$$

where $\mu_i$ is the class mean vector, $\Sigma_{wni}$ is the within class covariance matrix of each class and $|\Sigma_{wni}|$ its determinant. Then the elements of the score vector SC are computed as follows:

$$sc_i = d_i / \Sigma_k^D d_k \quad (20)$$

Figure 7:
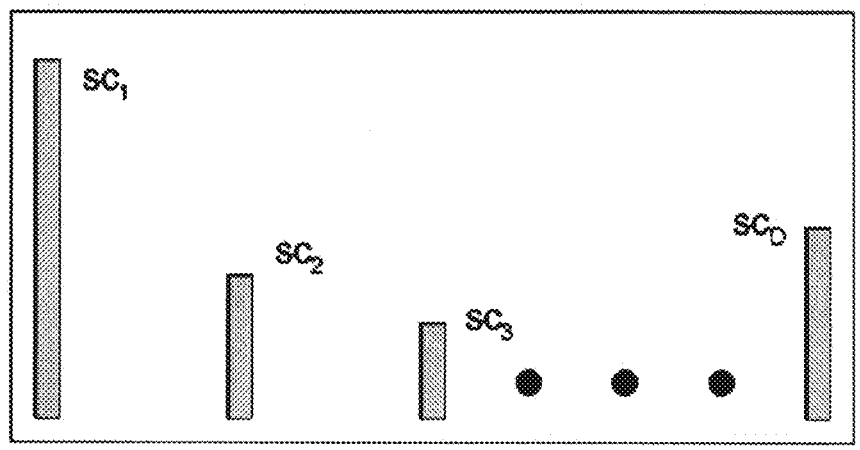
FIG. 7 illustrates a visualization showing the membership percentages of each motion vector to the various classes.

The vector elements of the vector $\widehat{SC}$ corresponding to the membership percentages of each motion vector to the various classes. A possible visualization exploiting the system output in this case, is shown in FIG. 7. In this, each element of the vector SC, corresponds to a specific bar.

Motion State Output Unit (226 in FIG. 2)

One aim of this unit is to output the motion state or the motion state vector to the system output.

The exemplary systems and methods of this disclosure have been described in relation to camera motion analysis. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. Similarly, one or more functional portions of the system could be distributed between a camera device(s) and an associated computing device(s).

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and/or fiber optics, and may take the form of acoustic or light waves, such as those generated during radio-wave and infra-red data communications.

Also, while the flowcharts and methodology have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide and/or claim some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

REFERENCES

All of which are Incorporated Herein by Reference in their Entirety

1. *System Identification: Theory for the User*, Second Edition, by Lennart Ljung, Chapter 4, pages 87-88, Prentice Hall PTR, 1999.
2. *Empirical Evaluation of Dissimilarity Measures for Color and Texture*, J. Puzicha, et all. The Proceedings of the Seventh IEEE International Conference on Computer Vision, 1999. (Volume 2), pp. 1165-1172.
3. *Pattern Classification, 2nd Edition*, Richard O. Duda, Peter E. Hart, David G. Stork Chapter 4, pp. 44-51 and Chapter 10, pp. 53, Willey 2000.

The invention claimed is:

1. A method comprising:
   classifying a motion status of a moving body by determining, by at least one processor and a camera, local motion vectors from pairs of successive video frames captured by the camera, wherein the camera is attached to the moving body, wherein, the classification is further optimized by reducing a dimensionality of a feature space by seeking a linear projection that maximizes a ratio of between-class variance to within-class variance.

2. The method of claim 1, wherein the classification of the motion status is performed using pattern classification techniques, classifying the motion models into two or more classes utilizing an appropriate score.

3. The method of claim 1, wherein coefficients of the polynomial modeling vary with time, and where the speed of variation is controllable by a user parameter.

4. A system comprising:
   a camera; and
   a processor, in communication with the camera, configured to determine a motion status of a moving body by determining local motion vectors from pairs of successive video frames captured by the camera, wherein the camera is attached to the moving body; wherein a classification is optimized by reducing a dimensionality of a feature space by seeking a linear projection that maximizes a ratio of between-class variance to within-class variance.

5. The system of claim 4, wherein coefficients of the polynomial model vary with time, and where a speed of variation is controllable by a user parameter.

6. The system of claim 4, wherein the classification of the motion status is performed using supervised pattern classification techniques, classifying the motion models into two or more classes utilizing a score.

7. The system of claim 2, where the classification is further optimized by reducing the dimensionality of the feature space by seeking the linear projection that maximizes a ratio of the between-class variance to the within-class variance.

\* \* \* \* \*